United States Patent [19]

Kelch et al.

[11] Patent Number: 5,291,369
[45] Date of Patent: Mar. 1, 1994

[54] THREE-POLE, METAL-ENCASED, PRESSURIZED-GAS-INSULATED, HIGH-VOLTAGE SWITCHGEAR

[75] Inventors: Thomas Kelch; Manfred Meinherz, both of Berlin, Fed. Rep. of Germany

[73] Assignee: Siemens Aktiengesellschaft, Munich, Fed. Rep. of Germany

[21] Appl. No.: 855,022

[22] PCT Filed: Sep. 13, 1990

[86] PCT No.: PCT/DE90/00711
§ 371 Date: Jul. 2, 1992
§ 102(e) Date: Jul. 2, 1992

[87] PCT Pub. No.: WO91/06996
PCT Pub. Date: May 16, 1991

[30] Foreign Application Priority Data

Nov. 2, 1989 [DE] Fed. Rep. of Germany ....... 3936759

[51] Int. Cl.⁵ .................................................. H02B 1/04
[52] U.S. Cl. ................................. 361/605; 200/148 B; 200/148 F
[58] Field of Search ............... 200/48 R, 50 R, 50 C, 200/50 AA, 148 R, 148 B, 148 A, 148 F, 148 G, 144 R, 144 AP; 361/332–335, 356, 357, 376, 427, 429, 601, 602, 605, 619

[56] References Cited

U.S. PATENT DOCUMENTS

| | | | |
|---|---|---|---|
| 3,712,969 | 1/1973 | Calvino | 200/148 |
| 4,429,199 | 1/1984 | Pircher et al. | 361/335 |
| 4,527,220 | 7/1985 | Boersma | 361/332 |
| 4,644,442 | 2/1987 | Ponsioen et al. | 361/335 |
| 4,821,143 | 4/1989 | Holmgren | 361/335 |

FOREIGN PATENT DOCUMENTS

| | | |
|---|---|---|
| 0093225 | 4/1986 | European Pat. Off. . |
| 2089315 | 7/1972 | France . |
| 0558094 | 1/1975 | Switzerland . |
| 0648152 | 2/1985 | Switzerland . |
| 2126790 | 3/1984 | United Kingdom . |
| 2246239 | 7/1990 | United Kingdom ............... 361/335 |

Primary Examiner—Gerald P. Tolin
Attorney, Agent, or Firm—Kenyon & Kenyon

[57] ABSTRACT

A three-pole, metal-encased, pressurized-gas-insulated, high-voltage switchgear may include a single-pole, encapsulated, high-voltage power switch. Breaker units are located in a pressure chamber and are arranged with longitudinal axes thereof parallel to one another, and are attached to a bearing component which also carries the casing of the drive. In order to increase the mechanical rigidity of the bearing component, a shared gear casing with two partitions is provided for the switching mechanism, to which the breaker units are attached via bearing rings. The bearing rings, held by bridges, lie in front of three apertures on a side wall of the gear casing, to the flanges of which the pressure chambers are also attached. In the interior of the gear casing, carriers for the bearings of the drive shafts are provided, which proceed from the partitions or an outer wall. All bearing and sealing surfaces of the gear casing lie in parallel planes in each case, and can be machined in a single clamping process. The shared gear casing for the switching mechanism is suitable for single-pole, encapsulated, pressurized-gas-insulated, high-voltage power switches of three-pole, metal-encased, pressurized-gas-insulated, high-voltage switchgears.

12 Claims, 5 Drawing Sheets

THREE-POLE, METAL-ENCASED, PRESSURIZED-GAS-INSULATED, HIGH-VOLTAGE SWITCHGEAR

BACKGROUND OF THE INVENTION

The invention relates to a three-pole, metal-encased, pressurized-gas-insulated, high-voltage switchgear with a single-pole, encapsulated, high-voltage power switch, with several breaker units lying next to each other, encapsulated with one pole in pressure chambers, which are each attached to a bearing component which is connected with a casing of the drive and of the switching mechanism, and the parallel axes of which run parallel to each other.

From FR 20 89 315, a multi-pole, encapsulated high-voltage switch with several breaker units lying next to one another in a shared casing is known, in which the switching mechanism is also housed in the same casing as the breaker units. The breaker units are each connected with the shared casing at their two ends, so that complicated disassembly is required for maintenance.

It is known, especially from CH-PS-558 094, to encapsulate the poles of the power switch of a three-pole, metal-encased, pressurized-gas-insulated, high-voltage switchgear in single-pole manner in each case, so that the breaker units of each pole are each housed in a separate pressure chamber, which is closed off by a cover on the frontal side.

From CH-PS-648 152 (cf. there particularly FIGS. 1 to 4), a multi-pole, metal-encased, pressurized-gas-insulated high-voltage switchgear of the type stated initially is known, in which the pressure chambers of the individual breaker units are each rigidly connected with the shared gear casing. There, the breaker units are each attached individually, in the individual pressure chambers.

SUMMARY OF THE INVENTION

The present invention is based on producing a mechanically more rigid connection of the breaker units relative to each other in a three-pole, metal-encased, pressurized-gas-insulated high-voltage switchgear.

To accomplish this task, it is provided, according to the present invention, in a pressurized-gas-insulated, high-voltage switchgear of the type described initially, that the breaker units are attached with bearing surfaces on the frontal side, on a shared gear casing which contains the switching mechanism of the drive, and can be moved relative to the pressure chambers, if necessary, the interior of which is divided into three sections, each assigned to a breaker unit, by two partitions, and the pressure chambers of the individual breaker units are connected with the gear casing via three flanges, each having an aperture, to form a gas seal, and that bearing rings for attachment of the breaker units to the gear casing are provided, which are connected with the gear casing via bridges which pass through the apertures.

With the bearing attachment of the breaker units to the shared gear casing and its strengthened structure due to the interior walls, it is ensured that the breaker units are attached in their position in such a way as to be easily adjustable and reliably attached. The gear casing has the form of a hollow carrier because of its essentially cuboid shape, which in itself already has great mechanical rigidity. The breaker units can be pulled out of the pressure chambers together with the gear casing, or pushed into them, for adjustment or maintenance work. This is advantageous, for example, also for the first assembly.

The region of each breaker unit which is filled with insulating gas extends beyond the pressure chambers to the gear casing in this design. In this way, no gas-sealed slide passage has to be provided at the coupling point between the pressure chambers and the gear casing, for the drive of the breaker unit. In addition, the flow-off space assigned to each breaker unit for the insulating gas is enlarged with this measure, so that pressure increases as the result of arc effects are attenuated by the enlargement of the volume.

The breaker units are attached to bearing rings, which in turn are held by the bridges attached on the inside of the gear casing. In this way, the breaker units can be attached to the gear casing without any attachment with the flanges The breaker units can thus be pulled out of the inside of the high-voltage switchgear by retraction of the gear casing through the flange openings of the pressure chambers Furthermore, the invention can be advantageously structured in that the sealing surfaces of the flanges lie in one plane.

This has the effect that the sealing surfaces on the gear casing can be machined during a single clamping process in its production. In this way, the production tolerances in the production of the gear casing are limited.

Also, for the purpose of enlarging the insulating gas volume available to each breaker unit, it can be advantageously provided that the sections of the gear casing are connected with each other via equalization apertures.

The equalization apertures are sized and positioned in such a way that they permit the exchange of insulating gas between the different breaker units, on the one hand, but on the other hand keep the effects of an arc in one of the breaker units away from the other breaker units.

The invention can furthermore also be advantageously structured in that the partitions of the gear casing have carriers for bearings of drive shafts. In this way, uncomplicated but stable design of the gear casing is made possible.

It is recommended that assembly apertures, which can be closed off by covers, be provided on the side wall of the gear casing opposite the flanges, the center axis of which is laterally shifted relative to the longitudinal axis of the breaker units. In this way, good accessibility to the interior of the gear casing is guaranteed, even after the pressure chambers and the breaker units are installed, which simplifies attachment of the parts of the switching mechanism to the switch rod and their alignment, for example.

When sections of the interior of the gear casing are connected with each other, it is furthermore advantageous to provide a shear plate in one cover of the three assembly apertures, with which an overly high pressure increase is prevented.

BRIEF DESCRIPTION OF THE DRAWINGS

In the following, the invention will be explained in greater detail on the basis of the embodiment shown in FIGS. 1 to 5, to which the invention is not restricted, however.

DETAILED DESCRIPTION

Figure 1:
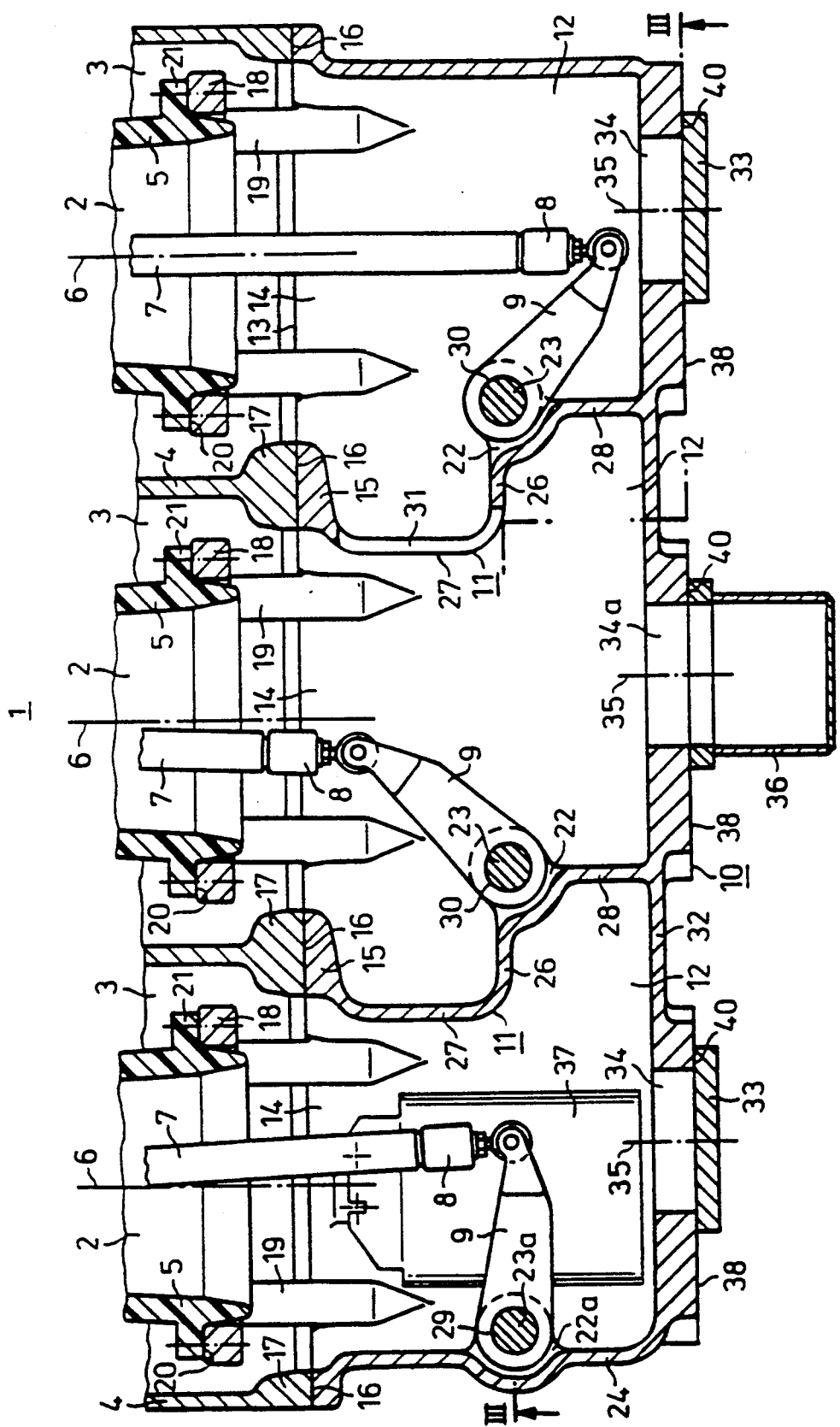
FIG. 1 shows a longitudinal cross-section through the gear casing and through part of the subsequent pressure chamber and breaker units of the power switch connected with it, in a schematic representation.

A three-pole, metal-encapsulated high-voltage switchgear insulated with pressurized gas, especially $SF_6$, has a single-pole, encapsulated, pressurized-gas-insulated power switch 1, especially a pressurized gas switch. The breaker units 2 of each pole are each located in a separate gas space 3, which is formed by pressure chambers 4, and are carried by a hollow support insulator 5. They are each arranged in their pressure chambers 4 with longitudinal axes 6, indicated with broken lines, parallel to one another.

To activate the switching contacts, not shown, of the high-voltage power switch 1, there are two opposite switch rods 7, which pass through the hollow support insulator 5. These switch rods 7 are connected with the fork lever of the switching mechanism 9 at their end 8 facing away from the switching contacts, which mechanism is housed in a shared gear casing 10 for all three poles of the high-voltage power switch 1.

The shared gear casing 10 has an approximately cuboid shape, which is similar to a hollow carrier. The interior of the gear casing 10 is divided into sections 12 each assigned to a breaker unit 2. The gear casing 10 therefore has great mechanical rigidity. It forms the bearing component for the breaker units 2 of the three poles of the high-voltage power switch 1 and also serves for attachment of its pressure chambers 4. This is independent of whether these pressure chambers 4 are connected with each other, also reinforcing each other.

On the first side wall 13 of the gear casing 10, three apertures 14 are provided, which are surrounded by flanges 15, the sealing surfaces 16 of which are aligned in one plane. The frontal flanges 17 of the pressure chambers 4 are attached at these sealing surfaces 16, forming a gas-tight seal. In front of the apertures 14, there is furthermore a bearing ring 18 in each case, which is held at a distance from the apertures 14 by bridges 19. These bridges 19 proceed from the inside surfaces of the walls of the gear casing 10 and pass through the apertures 14. On the bearing rings 18, there are bearing surfaces 20 in each case, which are also in one plane, which extends parallel to the plane of the sealing surfaces 16. The flange 21 of the hollow support insulator 5 and thus the breaker units 2 are attached at these bearing surfaces 20.

Figure 3:
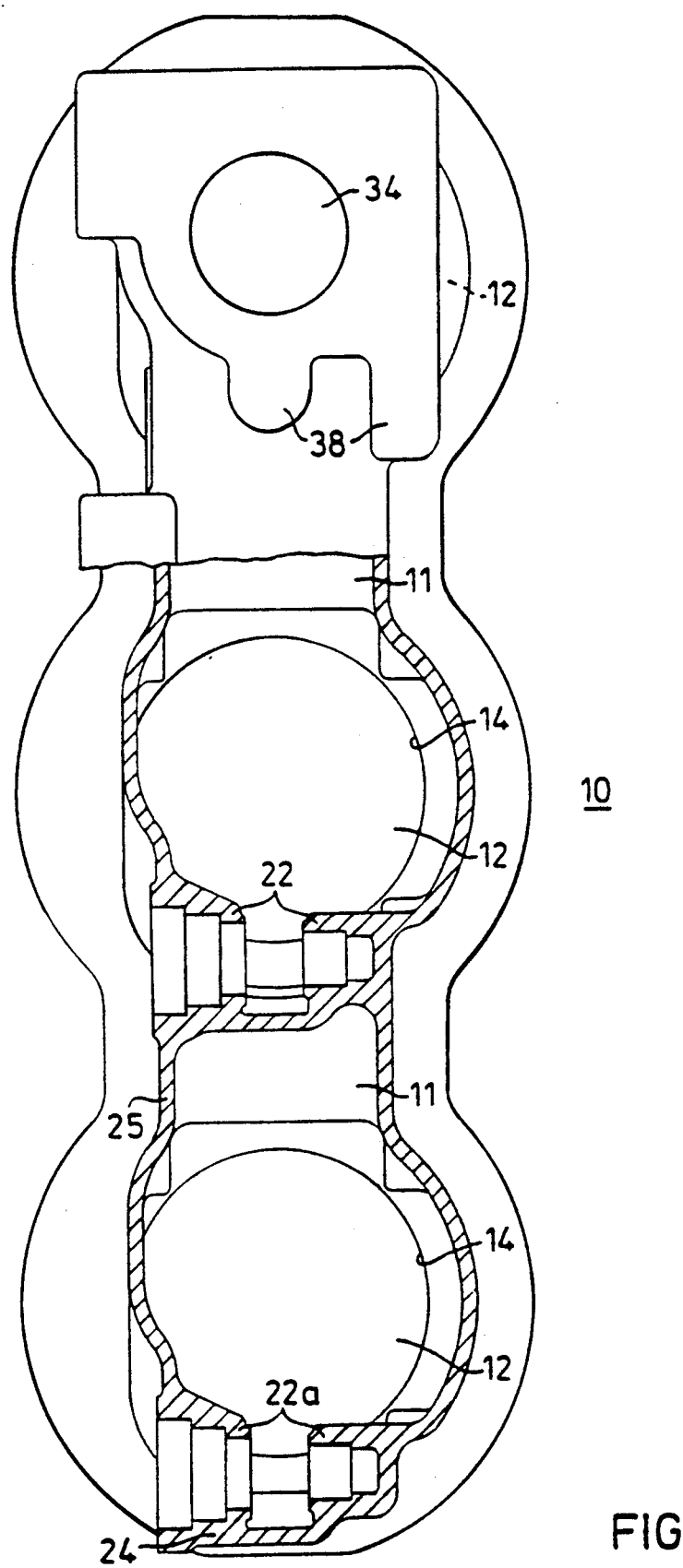
FIG. 3 shows a top view of the outside side surface only of the gear casing alone, without connected parts, which is cut along the line III—III in FIG. 1, along with a partial cross-section, and in the claims.
Figure 4:
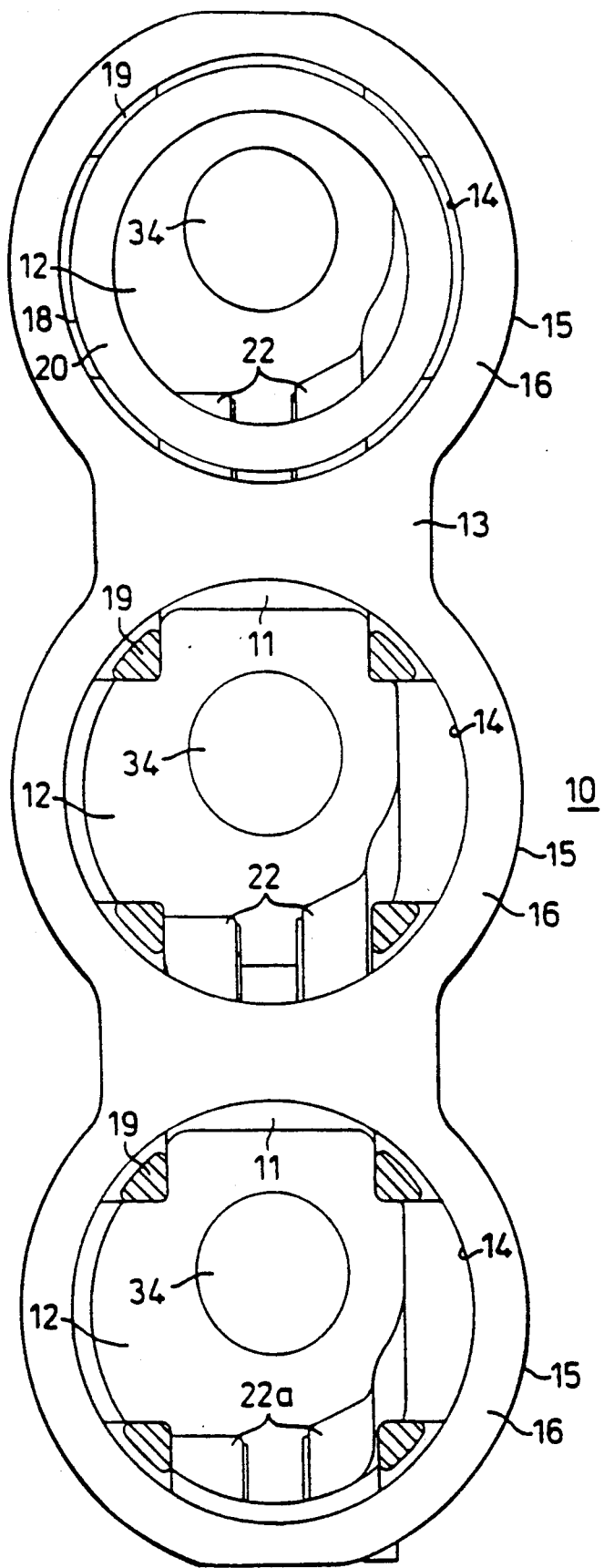
FIG. 4 shows a top view of the first side wall of the gear casing alone, in partial cross-section.

In each section 12 of the gear casing 10, there are furthermore carriers 22, 22a provided, which serve as bearings for the drive shafts 23, 23a for the switching mechanism 9. This drive shaft 23, 23a runs perpendicular to the longitudinal axis 6 of the breaker unit 2 in each case, and is arranged with lateral offset in the same direction in each section 12, relative to this axis. As a result, the carriers 22 for two of the three drive shafts 23 proceed from the partition 11, while the third carrier 22a for the third drive shaft 23a proceeds from an outside wall 24 of the gear casing 10. The drive shafts 23, 23a each are passed to the outside via a second side wall 25 of the gear casing 10 (FIG. 3).

The partitions 11 inside the gear casing 10 each have two regions 27, 28 which run parallel, shifted laterally in the same direction relative to the longitudinal axis 6 of the breaker units 2, connected by a step 26. The first region 27 opens into the first side wall 13 and is offset in the direction of the outside wall 24 relative to the second region 28, which wall has the carrier 22a for the one bearing 29 of the drive shaft 23a. The carriers 22 for the two other bearings 30 of the drive shaft 23 each proceed from the step 26 of the partition 11.

The first region 27 of the partition 11 is offset laterally to the adjacent section 12 to such an extent that it projects into the region behind the aperture 14 there. In this manner, an aperture 31 can be produced by milling in this region 27 of the partition 11, in simplest manner. The aperture 31 connects the separate sections 12 of the interior of the gear casing 10 with each other in each case, so that these form a shared gas space. So that the openings 31 have as large an area as possible, the step 26 of the partition 11 with the carriers 22 is arranged off-center in the direction of the outside side wall 32 of the gear casing 10, seen in the longitudinal direction 6 of the breaker units 2 in each case.

In this outer side wall 32, three assembly apertures 34, 34a which can be closed off with covers 33 are provided. The center axis 35 of the assembly apertures 34, 34a is shifted laterally towards the second region 28 of the partition 11 relative to the longitudinal axis 6 of the breaker units 2. Due to the assembly apertures 34, 34a, the end 8 of the switch rods 7 is easily accessible, so that the fork lever of the switching mechanism can be attached to the switch rods 7 in a simple manner, and these can be aligned precisely, even if the breaker units 2 are already arranged on the carrier ring 18.

Since the interior of the gear casing 10 forms only a single gas space, due to the openings 31 formed in the partition 11 due to subsequent machining of the partition 11, it is sufficient that only the center assembly aperture 34a is provided with a cover 36, which contains a shear plate.

Furthermore, holder plates 37 for filter material are attached in all three sections 12 of the gear casing 10, on the inside surface at the foot of a bridge 19.

Furthermore, connection surfaces 38 are provided on the outside side wall 32, lying in one plane, to which drive casings or a carrier element 39 for additional drive components can be attached.

The connection surfaces 38 on the outside side wall 32 and the sealing surfaces 40 for the covers 33, 36 of the assembly apertures 34, 34a each lie in one plane, whether in the same or parallel planes, which in turn run parallel to the planes of the sealing surfaces 16 of the flanges 15 and thus also parallel to the connection surfaces 20 on the carrier rings 18. This results in significant simplification in the production of the shared gear casing 10, since all these surfaces can be machined in a single clamping process of the gear casing 10. Therefore these surfaces also demonstrate the same production tolerances relative to each other in each case.

Figure 2:
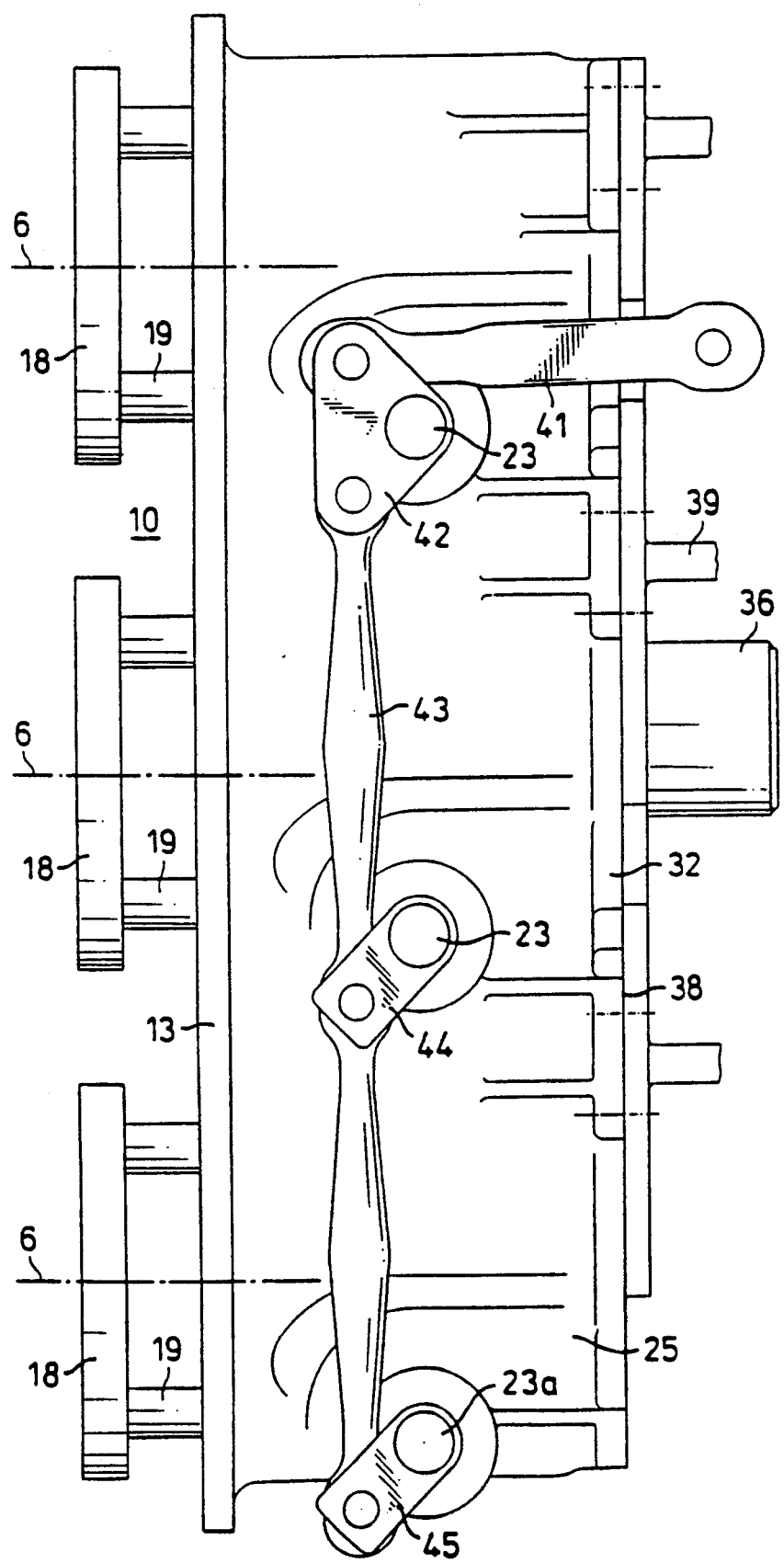
FIG. 2 shows the corresponding top view.

The same holds true for the holder surfaces for the bearings 29, 30 of the drive shafts 23, 23a on the carriers 22, 22a. A shared drive is used for all three poles of the high-voltage power switch 1 (see FIG. 2). The drive, not shown, is passed via a drive rod 41 to a crank 42 connected with a drive shaft 23, which crank in turn is connected with the cranks 44 and 45 of the two other drive shafts 23, 23a, via a simple coupling rod. Because of the same production tolerances for bearings of all three drive shafts 23, 23a, special setting and adaptation possibilities of the coupling rod 43 can be eliminated.

Figure 5:
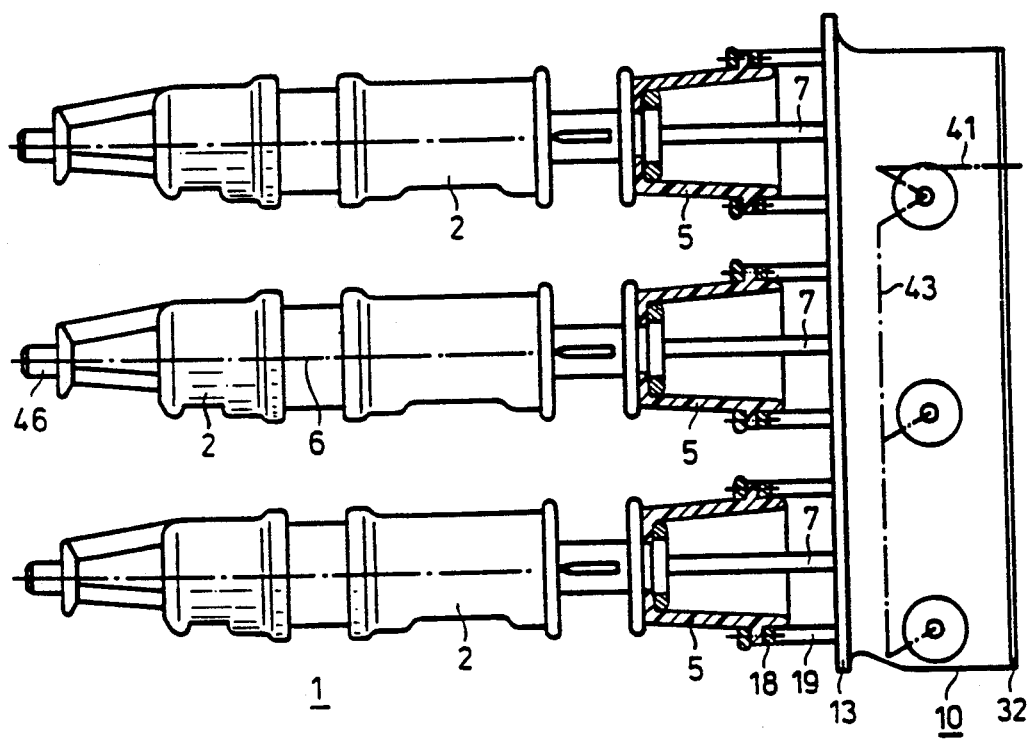
FIG. 5 shows a view of the gear casing, in partial cross-section, together with the breaker units and pressure chambers connected with it.

The shared gear casing 10 for the switching mechanism 9 for activation of the switch contacts of the breaker units 2 of the high-voltage power switch 1 therefore forms a mechanically rigid bearing component both for the breaker units 2 and for their pressure chambers 4. In this connection, the flanges 17 of the pressure chambers 4 are attached to the flanges 15 of the gear casing 10, and the breaker units 2 are attached to the carrier rings 18 via the flange 21 of the support insulator 5, which rings in turn are carried by the bridges 19 and by the gear casing 10. The stresses on the gear casing 10 which proceed from these attachments are thus absorbed by spatially separate regions of the gear casing 10. Since the connection leads 46 of the breaker units 2, which each lead to the other parts of the high-voltage switchgear, are structured as plug connections (see FIG. 5), the breaker units 2 still attached to the gear casing 10 can be moved together with the gear casing 10 for service purposes. For this purpose, the pressure chambers 4 are first separated from the flanges 15.

In addition, the sections 12 of the interior of the gear casing 10 each form additional gas spaces, the volume of which adds to the volume of the gas spaces 3 in the pressure chambers 4, so that in case of possible interference arcs, the pressure increase in these gas spaces 3 is reduced. If apertures 31 are provided in the partitions 11 of the gear casing 10, this buffer effect is further strengthened, because a shared gas space is formed. Thus, advantages are achieved with this shared gear casing 10 which is provided for the three single-pole encapsulated breaker units 2 not only in a mechanical respect and a design respect, but also in an electrical respect.

What is claimed is:

1. A three-pole, metal-encased, pressurized-gas-insulated, high voltage switchgear with a single-pole, encapsulated, high-voltage power switch, wherein breaker units of each pole are located in pressure chambers and arranged with parallel longitudinal axes, and are each attached to a bearing component which is connected with a casing of the drive and of a switching mechanism, the switchgear comprising:

a shared gear casing for the switching mechanism of the drive, an interior of which is divided by two partitions into three sections, each assigned to a breaker unit;

three apertures on a first side wall of the shared gear casing which are surrounded by flanges with sealing surfaces lying in a common plane, to which the pressure chambers of the breaker units are attached;

a bearing ring in front of each of the apertures and held at a distance by bridges of the gear casing which pass therethrough, to which the breaker units are attached; and in each of the three sections, carriers to hold bearings of the drive shaft which each run perpendicular to a longitudinal axis of a respective breaker unit and are arranged with lateral offset relative to this axis in each section, and are passed to the outside via a second side wall of the gear casing, wherein the carriers proceed from the partitions or an outer wall.

2. A three-pole, metal-encased, pressurized-gas-insulated, high voltage switchgear according to claim 1, wherein the three sections of the gear casing are connected with each other.

3. A three-pole, metal-encased, pressurized-gas-insulated, high voltage switchgear according to claim 1, wherein each partition has two regions shifted laterally in a same direction relative to the longitudinal axis of the breaker units and connected by a step, where a first of the two regions opens into the first side wall and is offset in the direction of the outer wall relative to the second region, which wall has one bearing of the drive shaft, and that the carriers for two other bearings of the drive shaft are each located on the step.

4. A three-pole, metal-encased, pressurized-gas-insulated, high voltage switchgear according to claim 3, wherein the first region of each partition projects into the aperture of the adjacent section located in the first side wall of the gear casing.

5. A three-pole, metal-encased, pressurized-gas-insulated, high voltage switchgear according to claim 3, wherein apertures are located in the first region of each partition.

6. A three-pole, metal-encased, pressurized-gas-insulated, high voltage switchgear according to claim 3, wherein the step of each partition is arranged in the gear casing off-center in the longitudinal direction of the breaker units.

7. A three-pole, metal-encased, pressurized-gas-insulated, high voltage switchgear according to claim 1, wherein three assembly apertures which can be closed off with covers are provided on an outer side wall which is located in front of the first side wall, the center axis of the three assembly apertures being shifted laterally relative to the longitudinal axis of the breaker units.

8. A three-pole, metal-encased, pressurized-gas-insulated, high voltage switchgear according to claim 7, wherein at least one of the covers of the assembly apertures contains a shear plate.

9. A three-pole, metal-encased, pressurized-gas-insulated, high voltage switchgear according to claim 1, wherein connection surfaces which lie in a common plane are provided on an outer side wall which is located in front of the first side wall, for casings or carriers of additional drive components.

10. A three-pole, metal-encased, pressurized-gas-insulated, high voltage switchgear according to claim 1, wherein the three bearing rings have bearing surfaces for attachment of the breaker units, the bearing surfaces lying in a common plane which is parallel to the plane in which the sealing surfaces lie for attachment of the pressure chambers of the three breaker units.

11. A three-pole, metal-encased, pressurized-gas-insulated, high voltage switchgear according to claim 9, wherein three assembly apertures which can be closed off with covers are provided on the outer side wall, the center axis of the three assembly apertures being shifted laterally relative to the longitudinal axis of the breaker units.

12. A three-pole, metal-encased, pressurized-gas-insulated, high voltage switchgear according to claim 11, wherein the connection surfaces of the outer side wall and sealing surfaces for the covers of the assembly apertures lie in a common plane or in parallel planes, which run parallel to the sealing surfaces of the flanges.

* * * * *